C. R. Fisher,

Reversible Latch,

No. 3,990, Reissued May 24, 1870

Witnesses
Wm. Jones
Thomas Cole.

Inventor
Charles R. Fisher.

N. PETERS, PHOTO-LITHOGRAPHER, WASHINGTON, D. C.

United States Patent Office.

RUSSELL & ERWIN MANUFACTURING COMPANY, OF NEW BRITAIN, CONNECTICUT, ASSIGNEES OF CHARLES R. FISHER.

*Letters Patent No.* 80,539, *dated August* 4, 1868; *reissue No.* 3,990, *dated May* 24, 1870.

IMPROVEMENT IN REVERSIBLE KNOB-LATCHES.

The Schedule referred to in these Letters Patent and making part of the same.

*To all persons to whom these presents shall come:*

Be it known that CHARLES R. FISHER, of Chelsea, in the county of Suffolk and State of Massachusetts, did invent a new and useful Improvement in Spring Locks for Doors, &c.; and it is hereby declared that the same is fully described in the following specification and represented in the accompanying drawing.

The invention relates to that class of reversible latches in which the latch can be reversed without the necessity of entire removal from the lock-case.

Of the said drawing—

Figure 1 denotes a side view, and

Figure 2, a front end view of the lock-case.

Figure 5:
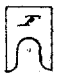

Figure 5 a side view of the furcated slider, which embraces the shank of the bolt, and serves to maintain the head of the bolt (when once adjusted) in its normal position or path of movement In the said drawing—

A denotes the lock-case, which is of rectangular shape, and constructed in the ordinary manner.

B is the front plate thereof.

Figure 1:
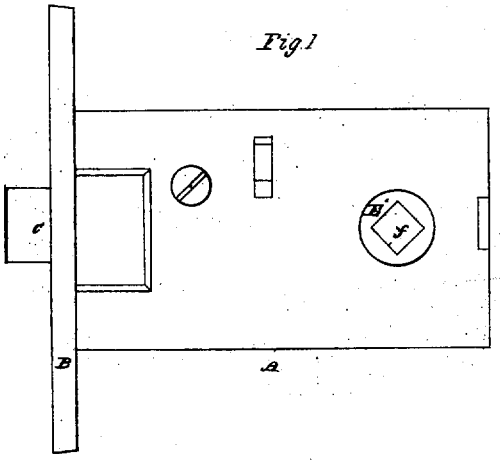
Figure 3:
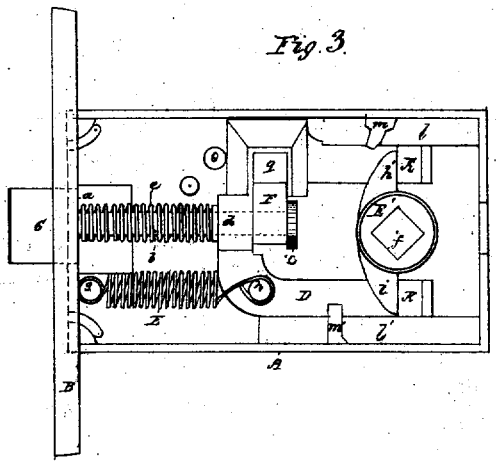
Figure 3 is a side elevation of the lock-case, with one of its plates removed, in order to exhibit the interior portion of the lock.
Figure 2:
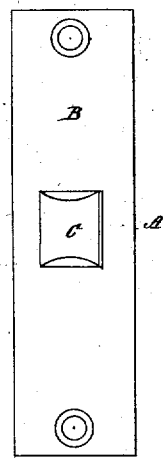
Figure 4:
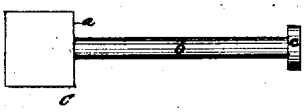
Figure 4 is a side view of the bolt.

C is the bolt, which is formed with a rectangular beveled head, *a*, and a cylindrical shank, *b*, the latter terminating in an annular shoulder or button, *c*, the whole being as shown in fig. 3.

The said shank passes through a hole made through a projection, *d*, formed in a U-shaped carriage, D, commonly called the horse-shoe plate, and is secured to the carriage in manner as shown in fig. 3.

Furthermore, the said shank is encompassed by a helical spring, *e*, one end of which rests against the head *a*, and the other end against the said projection *d*. This spring *e* should be what is termed an "easy spring"—that is, its coils should have an expansive force only a little greater than that required to return the bolt to its normal position after it may have been forced into its case. Were the spring a stiff or strong one, too great power would be required to close the door to which such lock was applied.

E is another coiled spring, extends longitudinally of the case, and has one of its ends attached to a stud, *g*, projecting up from the lock-plate, and its other end affixed to a stud, *h*, extending up from the carriage D, as shown in the said fig. 3. The object of this spring is to restore the carriage to its normal condition after the same has been forced backward by the key or knob-spindle.

E′ is the tumbler, which is of cylindrical form, and extends transversely through the two walls of the lock-case.

The said tumbler has a rectangular socket, *f*, made axially through it, to receive either a key or a knob-spindle shank.

The said tumbler has two arms, *h′ i*, extending from it in opposite directions.

The flat faces of the said arms rest against shoulders or projections *k k*, extending up from the rear part of the carriage D, as shown in fig. 3, the same constituting, in combination with the horse-shoe plate and springs, the devices for working the lock in common use.

The carriage D slides between parallel guides, *l l′*, and is maintained in its proper position by means of projections or ears, *m m′*.

The extent of movement of the said carriage should be equal to the distance that the head of the bolt projects beyond the face of the face-plate. The stud *o* limits its forward movement, and the rear part of the lock-case its backward movement.

By applying the hand of a person to the key or knob of the spindle going through the said tumbler, and revolving or turning the same a short distance in either direction, the head of the bolt may be drawn backward into the lock-case. By releasing the hand from the key or knob, the contractile force of the spring E will force the bolt forward to its original position.

In order to enable the lock to be readily adjusted so as to fit either a right or left-hand door, there is applied to the rear end of the bolt-shank, and so as to straddle it and rest against its button *e*, a bifurcated slider or saddle, F, which is disposed within a chamber, *q*, made in the carriage D, as shown in fig. 3.

The said saddle F is so formed and applied to its inner chamber as to move freely up and down within the same, which it will readily do when relieved from the action of the spring *e*, and the lock is inverted.

Another mode in which it is proposed to construct the slider F, is to form the lower end thereof with a tenon to enter a socket or hole made transversely through the shank of the bolt; but we do not consider this method as good as that above mentioned.

If we suppose the lock to be fixed so as to constitute what is termed a "right-hand" lock, and desire to change it to a "left-hand" lock, we have simply to press back (with the thumb or finger) the bolt flush with the face of the front plate B. The saddle or slider F will be then relieved of the action of the spring, and, by turning the case one hundred and eighty degrees, (or bottom side up,) the action of gravity will cause the saddle to slide back in its chamber, and thus become entirely disconnected from the shank of the bolt, and allow the head of the bolt to be withdrawn a short distance from the case. Next we revolve the bolt on its shank one hundred and eighty degrees; next push the head of the bolt into the case, and flush with the the face of the plate B; and next turn the lock-case back into its first position. The action of gravity will again force back the saddle into the position shown in fig. 3, and we have a lock adapted to fit a "left-hand" door.

It will be observed that the distinguishing feature of the construction and arrangement described is the employment of the saddle or slider F, in combination with the latch-shank and sliding plate, in such a manner that the turning of the lock bottom up disengages the slider from the latch-shank, and admits of its partial withdrawal from the case for the purpose of reversal.

What is claimed as the invention of said CHARLES R. FISHER, and desired to be secured by reissued Letters Patent, is—

The sliding plate D, latch, and slider, when so arranged that the latter, by its insertion between shoulders in the plate and a shoulder in the latch-shank, limits the action of the latch to that of the sliding plate D, and, by its removal, allows the latch to be reversed while still connected to the plate D, substantially as described, for the purposes specified.

RUSSELL & ERWIN M'F'G CO.
By M. J. WOODRUFF, *Att'y.*

Witnesses:
EMERY PARKER,
LEONARD DOIG.